(12) United States Patent
Keithley et al.

(10) Patent No.: US 7,359,082 B2
(45) Date of Patent: Apr. 15, 2008

(54) INDEPENDENT VIDEO HARDWARE BLOCKS TO SUPPORT LASER PRINTERS

(75) Inventors: Douglas Gene Keithley, Boise, ID (US); John David Marshall, Boise, ID (US); Richard David Taylor, Eagle, ID (US)

(73) Assignee: Marvell International Technology Ltd. (BM)

( * ) Notice: Subject to any disclaimer, the term of this patent is extended or adjusted under 35 U.S.C. 154(b) by 947 days.

(21) Appl. No.: 10/689,321

(22) Filed: Oct. 20, 2003

(65) Prior Publication Data

US 2005/0094164 A1   May 5, 2005

(51) Int. Cl.
*G06F 15/00* (2006.01)
*G06K 1/00* (2006.01)

(52) U.S. Cl. .................... 358/1.16; 358/1.7; 710/22; 345/530

(58) Field of Classification Search ............... 358/1.7, 358/1.16; 710/22; 345/530; 347/247
See application file for complete search history.

(56) References Cited

U.S. PATENT DOCUMENTS 5,511,152 A * 4/1996 Lai et al. .................... 358/1.16
5,870,535 A * 2/1999 Duffin et al. ............... 358/1.16

FOREIGN PATENT DOCUMENTS

JP         05108546 A   *   4/1993

* cited by examiner

*Primary Examiner*—King Y. Poon
*Assistant Examiner*—Lennin R Rodriguez

(57) ABSTRACT

A printer includes a direct memory access controller (DMA), a video processor, and a video signal generator. A frequency synthesizer connects to the video signal generator. Configuration registers bidirectionally connect to the DMA, video processor, the video signal generator and the frequency synthesizer. A data bus electrically connects the DMA and the configuration registers.

17 Claims, 5 Drawing Sheets

INDEPENDENT VIDEO HARDWARE BLOCKS TO SUPPORT LASER PRINTERS

BACKGROUND

In a laser printer, printing is achieved by first scanning a digitized image onto a photoconductor. Typically, the scanning is performed with diodes, e.g. laser diodes or light emitting diodes that pulse a beam of energy onto the photoconductor. The photoconductor typically comprises a movable surface coated with a photoconductive material capable of retaining localized electrical charges. The surface of the photoconductor is divided into small units called pixels. Each pixel is capable of being charged to a given electrical potential, independent of the electrical charge of each surrounding pixel.

In operation, the pixels are first charged to a base electrical charge as they move past a charging unit during each revolution of the photoconductor. Then, as the pixels move past the diodes, the beam of energy, e.g. a laser, is pulsed to remove the electrical charge from the selected pixels. The unaltered and altered pixels thus form an image on the photoconductor. One portion of pixels will attract toner, while the other portion will not based on various factors such as the electrical potential of the toner.

Next, the toner is transferred to a finished product medium, e.g. paper, transparency, fabric. After the toner is transferred to the finished product medium, the toner is affixed thereto. Any residual toner on the equipment is then removed by a cleaning station.

The digitized image is essentially organized into a two dimensional matrix within a raster. The image is digitized into a number of lines. Each line comprises a number of discrete points. Each of the points corresponds to a pixel on the photoconductor. Each point is assigned a binary value relating information pertaining to its color and potentially other attributes, such as density. The matrix of points makes up the resultant digitally stored image. The digital image is stored in computer readable memory as a raster image. Video blocks or scan control circuitry read the raster image data and actuates the laser to selectively expose a given pixel based on the presence or absence of coloration, and the degree of coloration for the pixel. For a four-color laser printer, at least one laser scanner is included in the printer and used to generate a latent electrostatic image on the photoconductor. Generally, one latent electrostatic image is generated for each color plane, e.g. cyan, yellow, magenta, and black, to be printed.

One prior art four-color laser printer is a four-pass that includes a single photoconductor and a single laser/mirror scanner system. In operation, each of the four color planes which make up an output image is consecutively developed on the photoconductor and completely deposited on the intermediate transfer device. A characteristic of the four-pass printer is that the size of output image produced thereby is limited by the length of the intermediate transfer device, since the entire output image is produced in its entirety on the intermediate transfer device before the image is transferred to the finished product medium.

Another prior art four-color laser printer is an in-line that includes four lasers and four in-line photoconductors. Each of the lasers is paired with one of the photoconductors. Also, each of the four colors of toner corresponds exclusively to one of the laser/photoconductor pairs. During operation of a typical in-line printer, each of the four color planes is developed on its own corresponding photoconductor and then deposited on the intermediate transfer device or, as in an alternative configuration, directly on the finished product medium. Generally, all of the color planes of a given image produced by an in-line printer are produced concurrently.

Current video blocks are designed for one type of printer. Thus, a video block used for a single beam in-line printer cannot be applied to a dual beam video laser printer. While a dual beam video block can be used in a single beam application, the silicon real estate is wasted.

SUMMARY

A scanning control circuit includes a direct memory access controller (DMA), a video processor, and a video signal generator. A frequency synthesizer connects to the video signal generator. Configuration registers bidirectionally connect to the DMA, video processor, the video signal generator and the frequency synthesizer. A data bus electrically connects to the DMA and the configuration registers. Bus control signals electrically connect to the DMA and the configuration registers.

DETAILED DESCRIPTION

Figure 1:
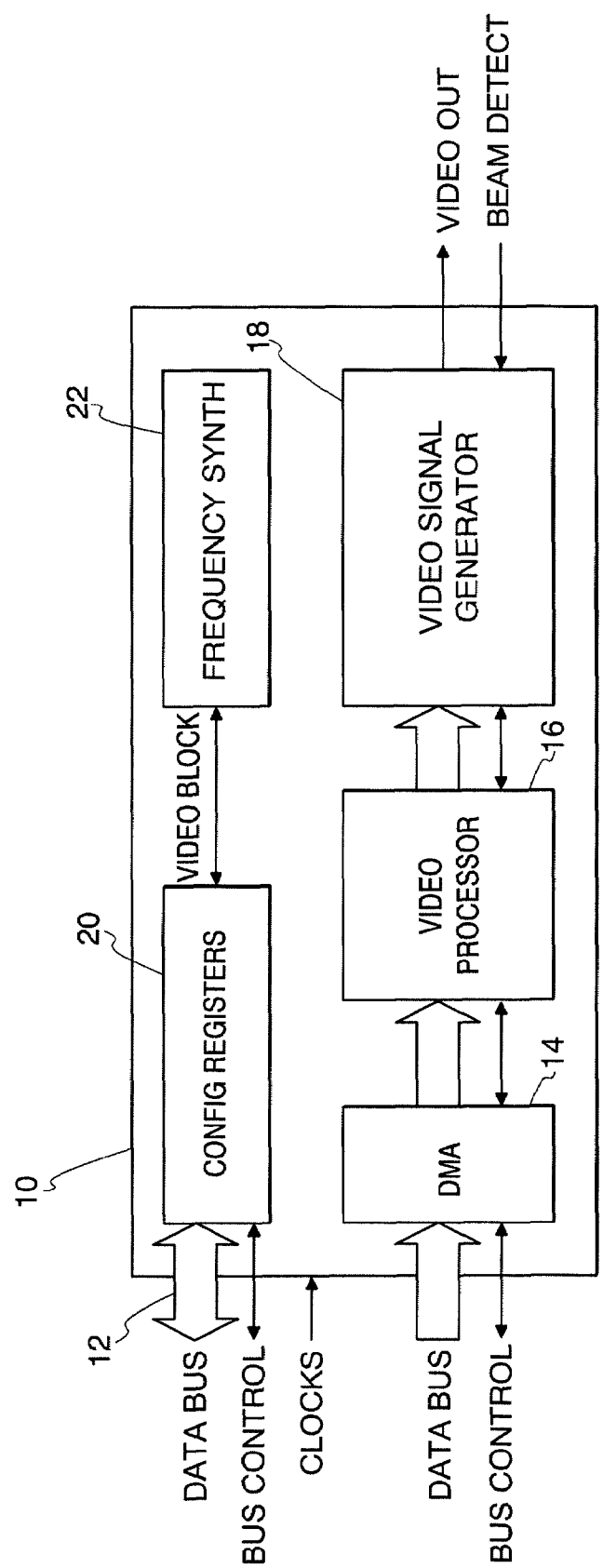
FIG. 1 discloses a scanning control circuit or video block of the present invention.

FIG. 1 discloses a scanning control circuit or video block 10 of the present invention. A data bus 12 electrically connects a direct memory access controller (DMA) 14 and configuration registers 20. The configuration registers 20 are bidirectionally connected to the DMA 14, video processor 16, the video signal generator 18 and frequency synthesizer 22. The DMA 14 transfers data to the video processor 16. The video processor 16 transfers data to the video signal generator 18. A frequency synthesizer 22 connects to the video signal generator 18. The video signal generator 18 generates a Video Out signal and receives a Beam Detect Signal. The Video Out signal goes to a laser module (not shown) and is used to turn the laser on and off at very high rates. The Beam Detect signal is received from the laser module (not shown) and is used to synchronize the output data. Thus, the Beam Detect signal functions as a horizontal synchronization signal.

Figure 2:
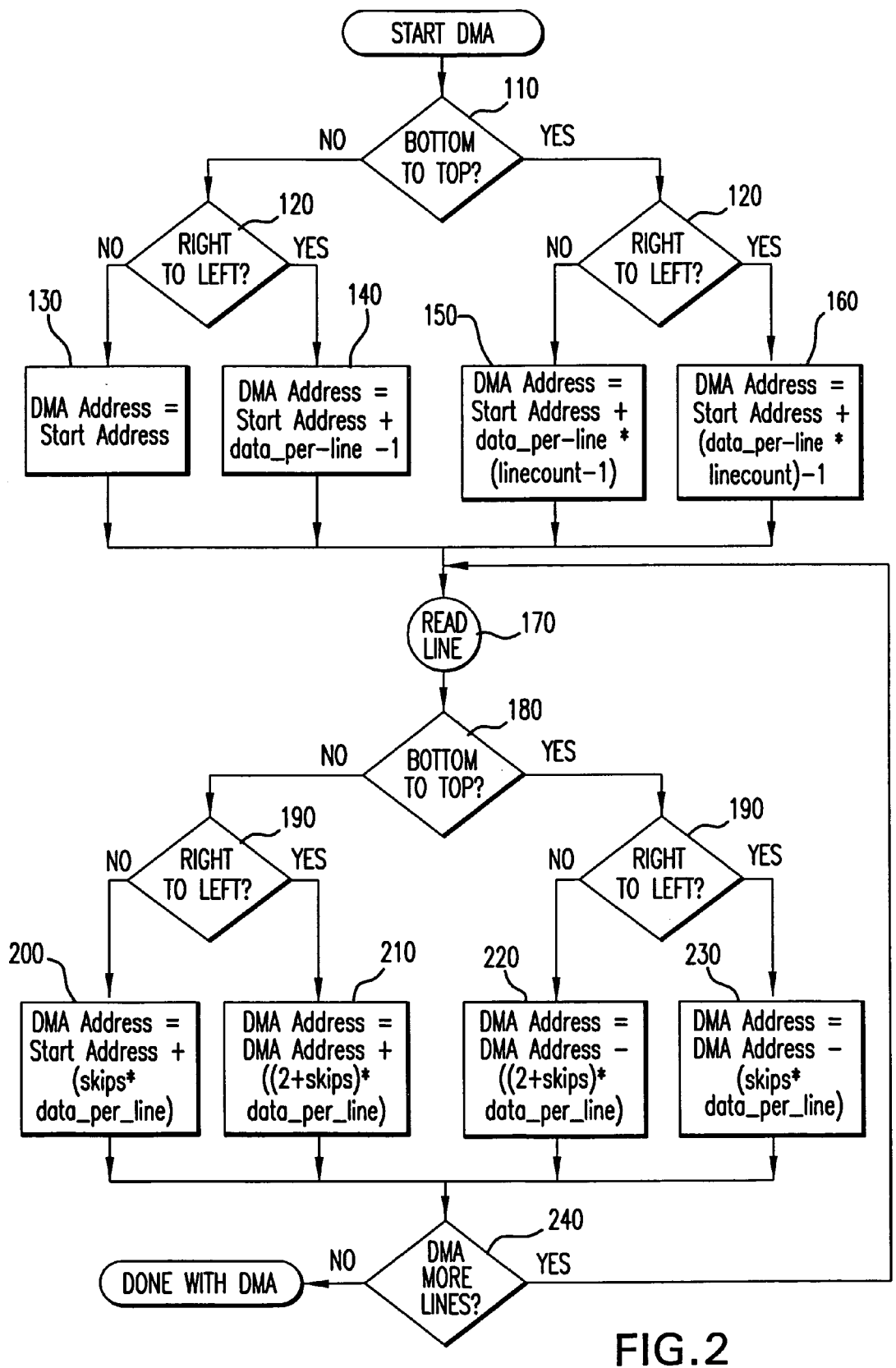
FIG. 2 corresponds to a process flowchart for the DMA shown in FIG. 1.

FIG. 2 corresponds to a process flowchart for the video controller shown in FIG. 1. In step 110, the vertical scanning direction of memory is selected. In step 120, the horizontal scanning direction of memory is selected. In step 130, if the memory scan is top-to-bottom and left-to-right, the DMA Address is initialized to the Start Address. In step 140, if the memory scan is top-to-bottom and right-to-left, the DMA Address is initialized to the Start Address+data_per_line−1. In step 150, if the memory scan is bottom-to-top and left-to-right, the DMA Address is initialized to the Start Address−data_per_line*(linecount−1). In step 160, if the memory scan is bottom-to-top and right-to-left, the DMA Address is initialized to the Start Address+(data_per_line*linecount)−1. In step 170, the line is read.

In step 180, the vertical scanning direction of memory is selected. In step 190, the horizontal scanning direction of memory is selected. In step 200, if the memory scan is top-to-bottom and left-to-right, the DMA Address is incremented to the DMA Address+(skips*data_per_line). In step 210, if the memory scan is top-to-bottom and right-to-left, the DMA Address is incremented to the DMA Address+((2+skips)*data_per_line). In step 220, if the memory scan is bottom-to-top and left-to-right, the DMA Address is incremented to the DMA Address−((2+skips)*data_per_line). In step 230, if the memory scan is bottom-to-top and right-to-left, the DMA Address is incremented to the DMA Address−(skips*data_per_line). In step 240, it is determined if there is a data line to read. If yes, then return to step 170. If no, stop.

Figure 3:
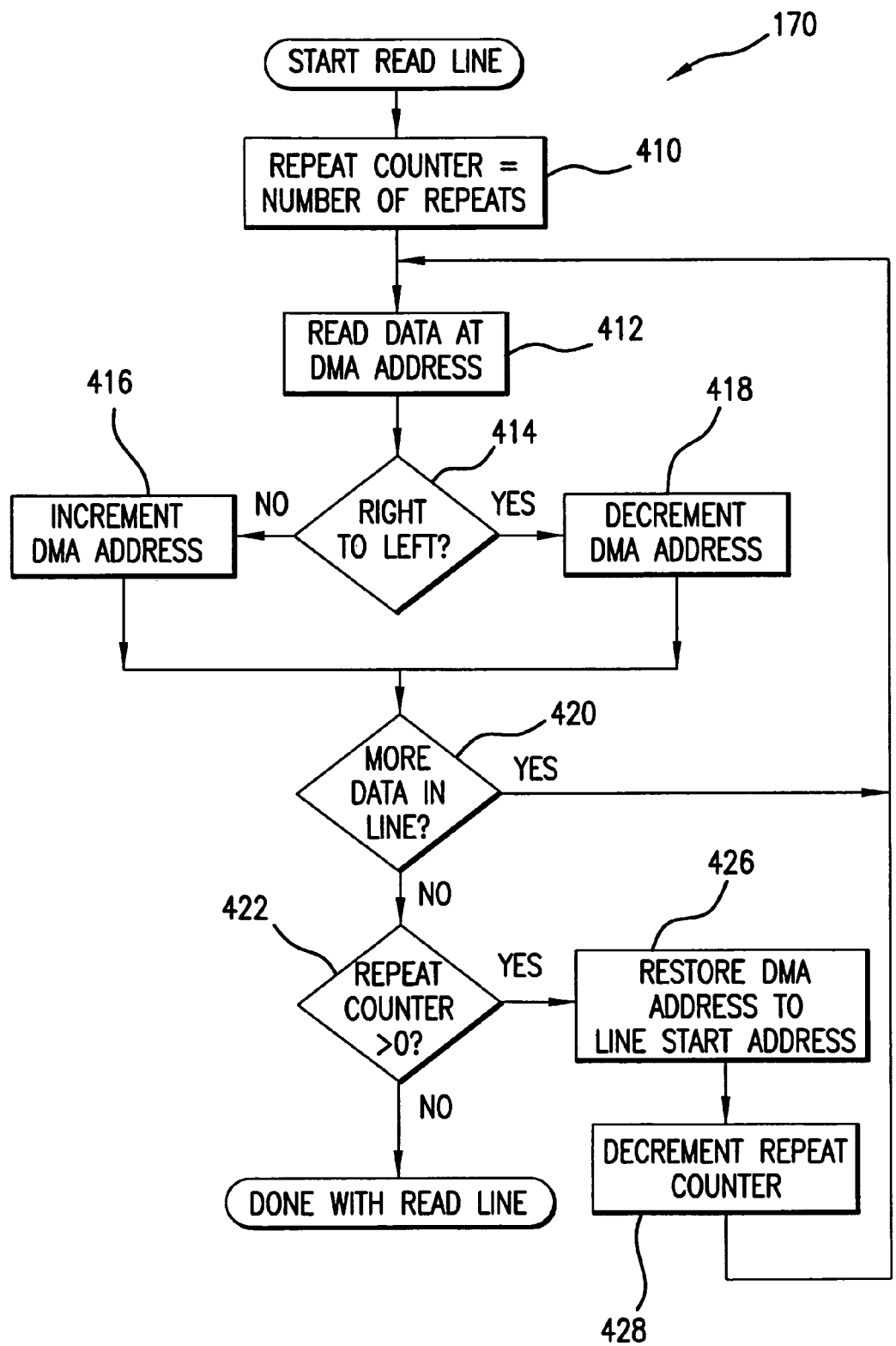
FIG. 3 corresponds to a process flowchart for step 170 shown in FIG. 2.

FIG. 3 corresponds to a functional block diagram of step 170 shown in FIG. 2. In step 410, the repeat counter is set to the number of repeats. In step 412, the data is read at the DMA address. In step 414, it is determined in what direction the horizontal read will occur. If the read is from left to right, in step 416, the DMA address is incremented. If the read if from right to left, in step 418, the DMA address is decremented. In step 420, it is determined if there is more data in the line. If yes, the controller returns to step 412. If no, in step 422, it is determined whether the repeat counter is greater than 0. If no, step 170 is complete. If yes, in step 426, the DMA address is restored to the line start address. In step 428, the repeat counter is decremented. Next, the controller returns to step 412.

This embodiment describes DMA transfers of a single byte, and a single pixel value is contained in the byte. This simplifies the process: walking forward or backward through the data is done by simply incrementing or decrementing the address by one and performing a read. The real system is more complicated since it grabs information in quadword chunks (16 sequential bytes). To go backward, the ordering of the bits and bytes needs to be addressed, and is also a function of how many bits/pixel are packed into a byte.

The starting address may be calculated by firmware and written to the starting address register so that a multiplexer and multiply functions needed to implement the initial starting address as shown in the flow diagram are not implemented in hardware.

In the prior art, the dual beam video shared a large window function in a local RAM between the two beams. The window assumes the beams are aligned temporally, and they are not. A first-in first-out buffer (FIFO) is also added before the pulse width modulator of the second beam to delay the aligned video signals to match up to the real printer limitations.

In the present invention, the two beams are no longer required to be aligned at some point in the hardware path. The video block can support either a single or dual beam monochrome printer or a dual beam multi-pass color printer.

Figure 4:
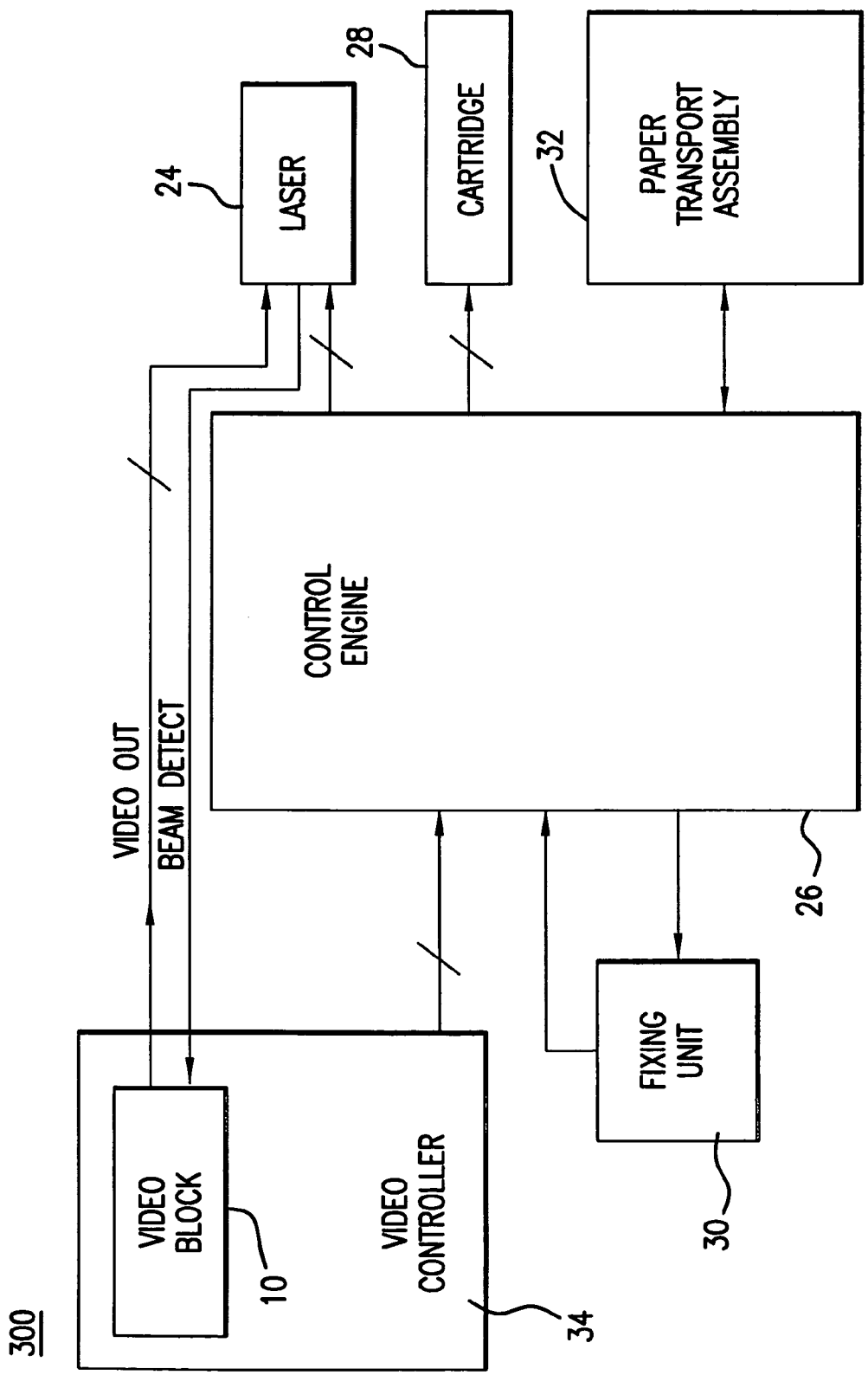
FIG. 4 illustrates a printer that includes at least one laser driver, a print control engine, and a video block according to the present invention.

FIG. 4 illustrates a monochromatic printer embodiment of the present invention. A video controller 34, that includes a video block 10, connects to a control engine 26 and a laser 24. A fixing unit 30 bidirectionally connects to the control engine 26. The control engine 26 connects to a toner cartridge 28 and a paper transport assembly 32.

While the illustrative embodiment uses one video block and one laser, one of ordinary skill in the art would see that performance of the monochromatic printer embodiment may be improved by adding additional combinations of video blocks and lasers. Alternatively, a quad beam color printer embodiment may be generated by adding an additional video block, laser, and toner cartridge for each additional color plane desired.

Figure 5:
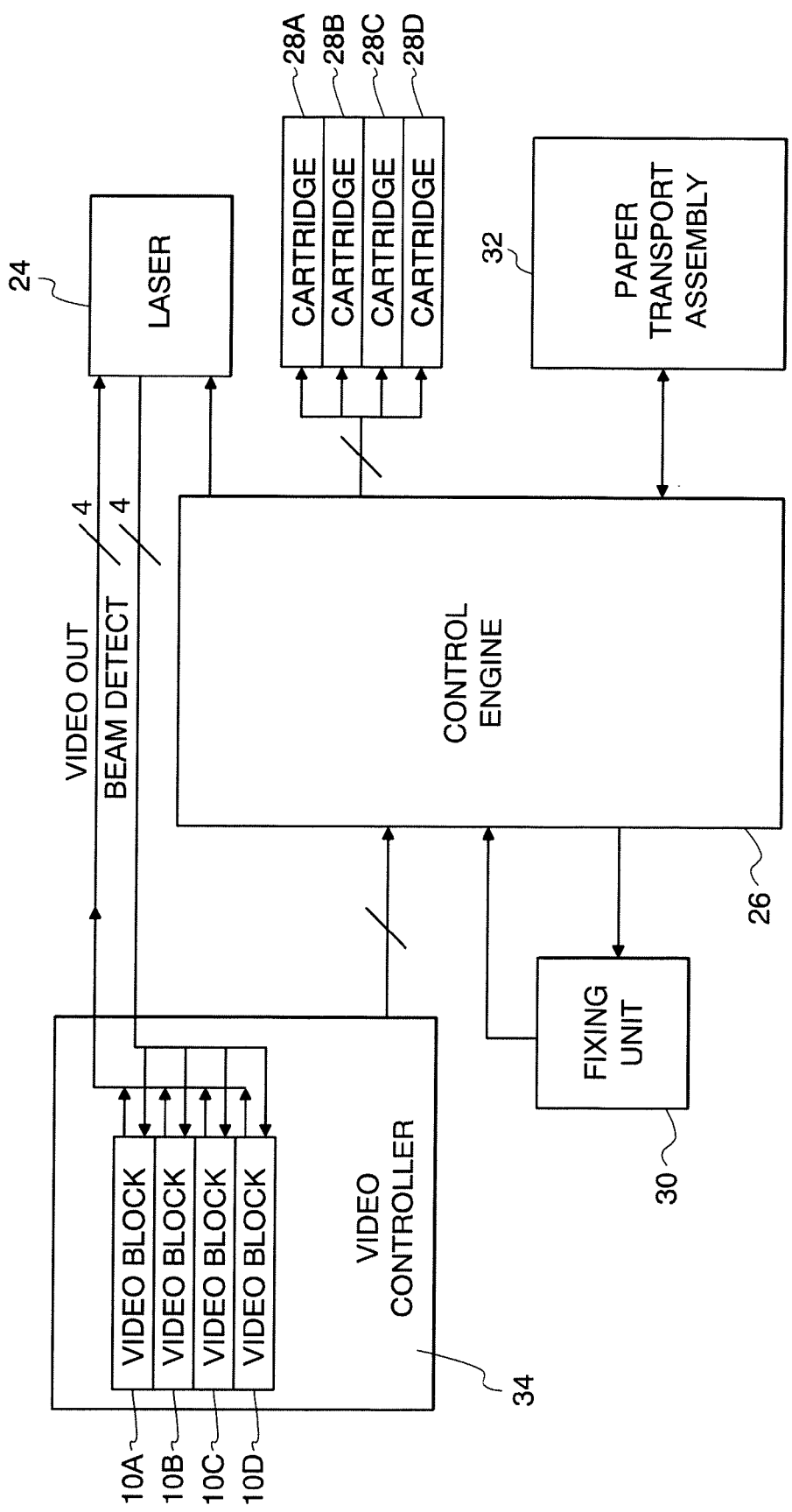
FIG. 5 illustrates a printer includes multiple laser drivers, a print control engine, and a series of video blocks according to the present invention.

FIG. 5 illustrates an in-line color printer embodiment of the present invention. A video controller 34, that includes a series of video blocks 10A-D, connects to a control engine 26 and a set of four lasers 24. A fixing unit 30 bidirectionally connects to the control engine 26. The control engine 26 connects to a series of toner cartridges 28A-D and a paper transport assembly 32.

While the illustrative embodiment uses a video block per color plane and one laser, one of ordinary skill in the art would see that a dual beam in-line color printer embodiment may be generated by adding four additional video blocks and replacing the single beam lasers with dual beam lasers. This concept may be extended to improve performance of the printer.

As each of the video blocks operate independently, a common set of test vectors can be applied to each block.

What is claimed is:

1. A printer comprising:
   at least one laser driver;
   a print control engine; and
   a video controller, bidirectionally connected to the print control engine and the at least one laser driver via a system bus, having a video block that includes, a direct memory access (DMA) controller;
   a video processor;
   a first data bus and control bus electrically connecting the DMA controller to the video processor;
   a video signal generator, connected to the video processor;
   a second data bus and control bus connecting the video processor to the video signal generator;
   a frequency synthesizer connected to the video signal generator;
   configuration registers bidirectionally connected to the DMA controller, video processor, the video signal generator and the frequency synthesizer; and
   a data bus and control bus electrically connecting the DMA controller and the configuration registers to the system bus.

2. A printer as defined in claim 1, the data bus and control bus including: a third data bus and control bus electrically connecting the configuration registers to the system bus; and a fourth data bus and control bus, electrically connecting the DMA controller to the system bus.

3. A printer as defined in claim 1, wherein the video controller generates one pass of the one laser driver, the image generated being monochromatic.

4. A printer as defined in claim 1, wherein the video controller generates multiple passes of the laser driver, the image generated containing four color planes.

5. A printer as defined in claim 1 further comprising three color laser drivers, each connected to the video controller which has four video blocks, the image generated being an in-line color image.

6. A printer as defined in claim 1, wherein: the video controller further includes a second video block; and a second laser driver connected to the video controller.

7. A printer as defined in claim 6, wherein the video controller controls sharing the pass of the two laser drivers, the image generated being monochromatic.

8. A printer as defined in claim 6, wherein the video controller generates multiple passes for each laser driver, the image generated containing four color planes.

9. A printer as defined in claim 6 further comprising seven laser drivers, each connected to the video controller which has eight video blocks, the image generated being in-line color image.

10. A printer having a laser driver, a print control engine and a video controller bidirectionally in communication with the print control engine and the laser driver via a system bus, the printer comprising:
 a video block, the video block in communication with the video controller and configured to include:
  a direct memory access (DMA) controller;
  a video processor;
  a first data bus and control bus communicatively coupling the DMA controller to the video processor;
  a video signal generator in communication with the video processor;
  a second data bus and control bus communicatively coupling the video processor to the video signal generator;
  a frequency synthesizer in communication with the video signal generator;
  configuration registers bidirectionally in communication with the DMA controller, video processor, the video signal generator and the frequency synthesizer; and
  a third data bus and control bus communicatively coupling the DMA controller and the configuration registers to the system bus.

11. The printer as defined in claim 10, wherein the third data bus and control bus further comprise:
 a fourth data bus and control bus communicatively coupling the configuration registers to the system bus; and
 a fifth data bus and control bus communicatively coupling the DMA controller to the system bus.

12. The printer as defined in claim 10, wherein the video controller controls one pass of the at least one laser driver to generate a monochromatic image.

13. The printer as defined in claim 10, wherein the video controller controls multiple passes of the at least one laser driver to generate an image containing a plurality of color planes.

14. The printer as defined in claim 10 further comprising a plurality of color laser drivers, each of the plurality of color laser drivers being in communication with the video controller which comprises a plurality of video blocks configured to generate an in-line color image.

15. The printer as defined in claim 10, wherein the video controller further includes:
 a second video block; and
 a second laser driver in communication with the video controller.

16. The printer as defined in claim 15, wherein the video controller controls sharing a pass of the laser driver and the second laser driver to generate a monochromatic image.

17. The printer as defined in claim 15, wherein the video controller generates multiple passes for each laser driver to generate an image containing four color planes.

* * * * *